(12) United States Patent
Osawa et al.

(10) Patent No.: US 9,114,797 B2
(45) Date of Patent: Aug. 25, 2015

(54) ENGINE CONTROL DEVICE

(75) Inventors: Toshifumi Osawa, Shiki (JP); Yusuke Takaishi, Niiza (JP); Koji Inose, Wako (JP); Naoki Ikeda, Asaka (JP); Junichi Sakamoto, Yokohama (JP); Junya Niwa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/122,021

(22) PCT Filed: May 31, 2011

(86) PCT No.: PCT/JP2011/062429
§ 371 (c)(1),
(2), (4) Date: Nov. 25, 2013

(87) PCT Pub. No.: WO2012/164677
PCT Pub. Date: Dec. 6, 2012

(65) Prior Publication Data
US 2014/0141936 A1    May 22, 2014

(51) Int. Cl.
*B60W 10/06*    (2006.01)
*B60W 10/18*    (2012.01)
(Continued)

(52) U.S. Cl.
CPC .............. *B60W 10/06* (2013.01); *B60W 10/18* (2013.01); *B62K 11/00* (2013.01); *B62K 11/14* (2013.01); *B62K 23/02* (2013.01); *F02D 11/02* (2013.01); *F02D 29/02* (2013.01); *F02N 11/0822* (2013.01); *B62K 2202/00* (2013.01); *F02N 11/0837* (2013.01); *F02N 11/101* (2013.01); *F02N 2019/007* (2013.01);
(Continued)

(58) Field of Classification Search
CPC ...... B60W 10/06; B60W 10/18; B60K 11/00; B60K 11/14
USPC .................................................. 477/203–207
See application file for complete search history.

(56) References Cited

U.S. PATENT DOCUMENTS 6,957,870 B2 * 10/2005 Kagawa et al. ............ 303/113.4

FOREIGN PATENT DOCUMENTS

| EP | 1 566 540 A2 | 8/2005 | |
|---|---|---|---|
| JP | 2005-264929 A | 9/2005 | |
| JP | 2014199007 A * | 10/2014 | .............. F02D 29/02 |

OTHER PUBLICATIONS

Extended European search report dated Feb. 20, 2015, issued over the corresponding EP Patent Application 11866672.6.

*Primary Examiner* — Tisha Lewis
(74) *Attorney, Agent, or Firm* — Carrier Blackman & Associates, P.C.; William D. Blackman; Joseph P. Carrier

(57) ABSTRACT

An engine control apparatus includes a first operation member and a second operation member for braking a front wheel and a rear wheel of a saddle-type vehicle, and an engine controller that automatically stops and restarts an engine mounted in the saddle-type vehicle in response to the operational state of the first operation member and the second operation member. When a prescribed amount of time has passed while the first operation member and the second operation member are both in an operated state, the engine controller automatically stops the engine; when the first operation member and the second operation member are both released, the engine controller restarts the engine; and when either one of the first operation member and the second operation member is operated after the engine has automatically been stopped, the engine controller allows the engine to continue in the automatically stopped state.

7 Claims, 9 Drawing Sheets

(51) Int. Cl.
*B60K 11/00* (2006.01)
*F02D 11/02* (2006.01)
*F02N 11/08* (2006.01)
*B62K 11/00* (2006.01)
*B62K 11/14* (2006.01)
*B62K 23/02* (2006.01)
*F02D 29/02* (2006.01)
*F02N 11/10* (2006.01)
*F02N 19/00* (2010.01)

(52) U.S. Cl.
CPC .. *F02N 2200/0801* (2013.01); *F02N 2200/101* (2013.01); *F02N 2200/102* (2013.01); *F02N 2300/2002* (2013.01); *F02N 2300/2011* (2013.01); *Y02T 10/48* (2013.01); *Y10T 477/87* (2015.01)

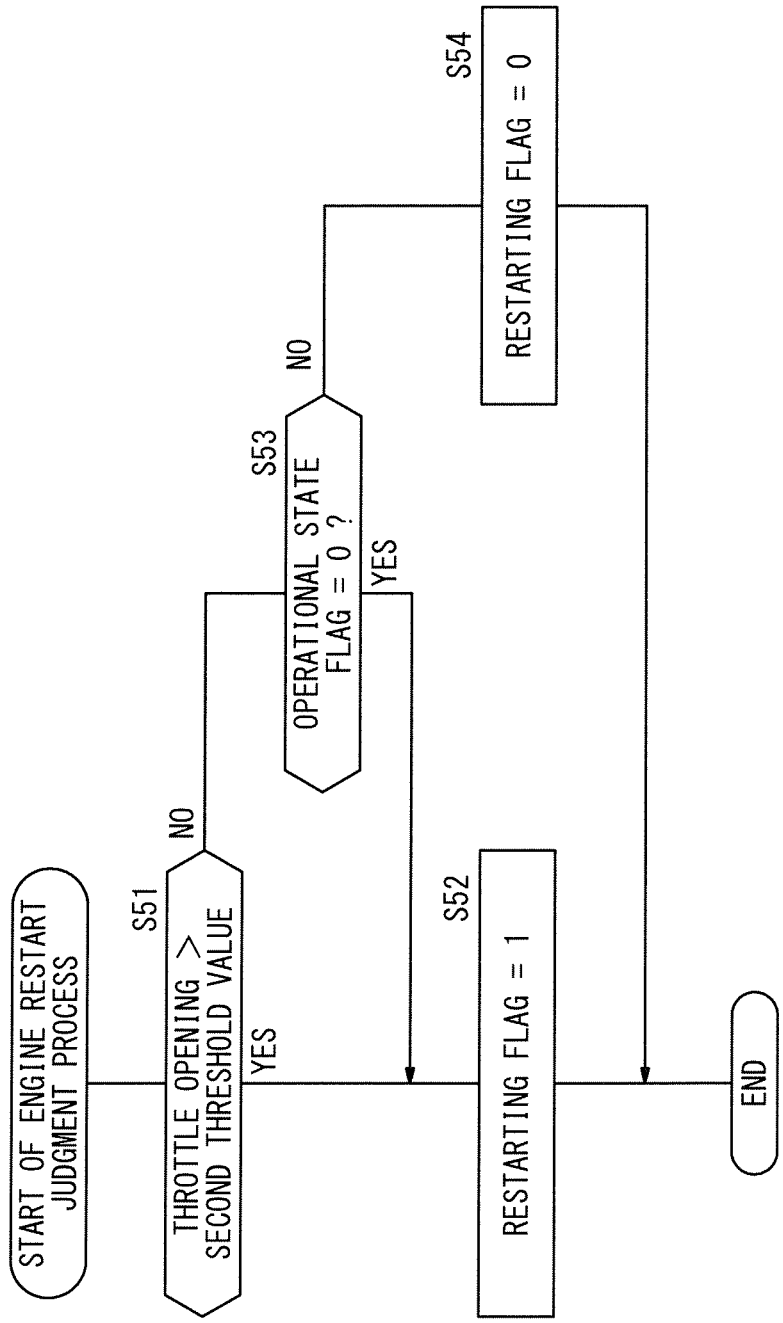

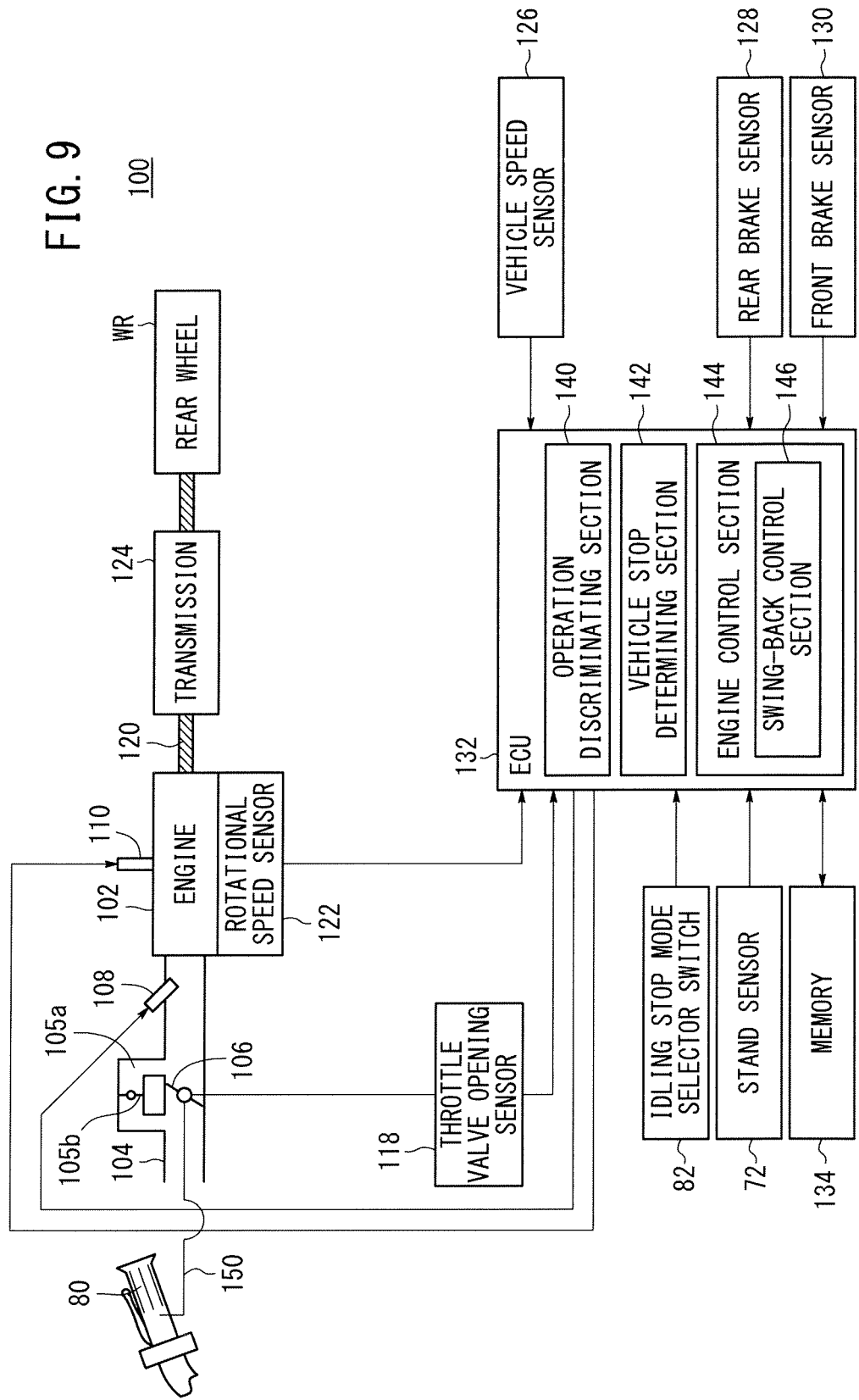

ENGINE CONTROL DEVICE

TECHNICAL FIELD

The present invention relates to an engine control apparatus (device) that performs an engine idling stop control process.

BACKGROUND ART

As disclosed in Japanese Laid-Open Patent Publication No. 2005-264929, it has been known in the art to perform an engine idling stop control process when a vehicle is braked to a vehicle speed of zero and a throttle opening of the vehicle is fully closed. Thereafter, when the vehicle is no longer braked, the engine idling stop control process is cancelled and the engine is restarted.

SUMMARY OF INVENTION

According to Japanese Laid-Open Patent Publication No. 2005-264929, when the driver of the vehicle operates both left and right brake levers (a rear brake lever and a front brake lever) to bring the vehicle to a stop, the engine is automatically shut off. Then, when the driver releases the right brake lever (the front brake lever), the engine is restarted. Therefore, if the engine should be kept in an automatically shut off condition, the driver has to keep the right brake lever in action at all times. During the time that the engine is automatically shut off, the driver has to place the right hand on the brake lever. When the driver needs to apply the rear brake with the right hand and perform throttle control with the right hand, in a situation where the vehicle is expected to start moving uphill on a slope, the engine is started, and the effect of the engine idling stop is reduced. Therefore, the driver is required to control the right hand elaborately, and is not able to move the right hand freely. Hence, the driver does not find the engine control convenient to use.

The present invention has been made in view of the aforementioned problems. It is an object of the present invention to provide an engine control apparatus, which the driver of a vehicle incorporating the same finds convenient to use while the engine control apparatus stops the engine of the vehicle from idling.

To achieve this object, in accordance with the invention recited in claim 1, there is provided an engine control apparatus comprising a first operating member and a second operating member operable by the rider of a saddle-type vehicle to brake a front wheel and a rear wheel of the saddle-type vehicle, an operation discriminator for discriminating operational states of the first operating member and the second operating member, and an engine controller for automatically shutting off and restarting an engine mounted on the saddle-type vehicle depending on operational states of the first operating member and the second operating member, wherein the engine controller automatically shuts off the engine upon elapse of a predetermined time period during a time that both the first operating member and the second operating member are operated, restarts the engine if both the first operating member and the second operating member are released, and keeps the engine automatically shut off if either one of the first operating member and the second operating member is operated after the engine has been automatically shut off.

According to the invention recited in claim 2, the engine control apparatus according to claim 1 further comprises a throttle opening detector for detecting the opening of a throttle for instructing the engine to accelerate, and a vehicle stop determiner for determining whether or not the saddle-type vehicle is stopped, wherein the engine controller automatically shuts off the engine upon elapse of the predetermined time period during a time that both the first operating member and the second operating member are operated, the opening of the throttle is equal to or less than a first threshold value, and the vehicle stop determiner determines that the saddle-type vehicle is stopped.

According to the invention recited in claim 3, in the engine control apparatus according to claim 2, the engine controller determines whether both the first operating member and the second operating member are operated after the throttle opening detector detects that the opening of the throttle is equal to or less than the first threshold value, and the vehicle stop determiner determines that the saddle-type vehicle is stopped.

According to the invention recited in claim 4, in the engine control apparatus according to claim 2, the engine controller restarts the engine if the opening of the throttle is greater than a second threshold value after the engine has been automatically shut off, even if one of the first operating member and the second operating member is operated.

According to the invention recited in claim 5, in the engine control apparatus according to claim 4, the engine controller determines whether the opening of the throttle is greater than the second threshold value after the engine has been automatically shut off, restarts the engine if the opening of the throttle is greater than the second threshold value, determines whether both the first operating member and the second operating member are not being operated if the opening of the throttle is not greater than the second threshold value, and restarts the engine if both the first operating member and the second operating member are not operated.

According to the invention recited in claim 6, the engine control apparatus according to claim 1 further comprises a rotational speed detector for detecting a rotational speed of a crankshaft, which rotates as the engine operates, wherein the engine controller includes a swing-back controller for performing a swing-back control process for reversing the crankshaft after the engine has been automatically shut off, and restarts the engine without performing the swing-back control process if the rotational speed of the crankshaft, which rotates by inertia, is equal to or greater than a predetermined value at a time that the engine is to be restarted.

According to the invention recited in claim 7, the engine control apparatus according to claim 1 further comprises a first operation detector for detecting operation of the first operating member, and a second operation detector for detecting operation of the second operating member, wherein the first operation detector and the second operation detector are capable of detecting operations of the first operating member and the second operating member in two stages, which are represented respectively by a first operational quantity, and a second operational quantity that is greater than the first operational quantity, and wherein the operation discriminator determines that the first operating member is being operated if the first operation detector detects operation of the first operating member by the first operational quantity or more, and determines that the second operating member is being operated if the second operation detector detects operation of the second operating member by the first operational quantity or more.

According to the invention recited in claim 1, since the engine is automatically shut off upon elapse of a predetermined time period during a time that both the first operating member and the second operating member are operated, the distance that the saddle-type vehicle is braked to a stop is shortened, and the engine is automatically shut off based on the intention of the rider to stop the saddle-type vehicle. During the time that the engine is automatically shut off, since the engine remains continuously shut off insofar as at least one of the operating member and the second operating member is operated, one of the right and left hands of the rider can be left free for the rider's convenience. In particular, if the rider wants the saddle-type vehicle to start moving uphill on a slope, or wants idling of the engine to be stopped as much as possible for improving fuel consumption even though the rider is inclined to start the saddle-type vehicle quickly, the rider may operate the first operating member with the left hand while performing a throttle control with the right hand. Thus, the rider can carry out both actions to automatically shut off the engine and to start the saddle-type vehicle. Further, when both the first operating member and the second operating member are released, the engine is restarted. Therefore, the intention of the rider to start the saddle-type vehicle can quickly be reflected upon restarting the engine.

According to the invention recited in claim 2, the engine is automatically shut off upon elapse of the predetermined time period during a time that both the first operating member and the second operating member are operated, the opening of the throttle is equal to or less than the first threshold value, and the saddle-type vehicle is stopped. Consequently, the intention of the rider to stop the saddle-type vehicle can be detected with good precision.

According to the invention recited in claim 3, the engine controller determines whether both the first operating member and the second operating member are operated after the throttle opening detector detects that the opening of the throttle is equal to or less than the first threshold value, whereupon the saddle-type vehicle is judged as being stopped. Therefore, the engine is prevented from being automatically shut off at times that the saddle-type vehicle is running by inertia with both the rear brake lever and the front brake lever being operated.

According to the invention recited in claim 4, the engine controller restarts the engine if the opening of the throttle is greater than the second threshold value, even if one of the first operating member and the second operating member is operated. Therefore, the engine can be restarted smoothly when the saddle-type vehicle is expected to start moving uphill on a slope.

According to the invention recited in claim 5, priority is given to opening the throttle rather than operations of the first operating member and the second operating member, as a basis for determining whether or not the engine should be restarted. Consequently, the intention of the rider to start the saddle-type vehicle can quickly be reflected upon restarting the engine.

According to the invention recited in claim 6, if the rotational speed of the crankshaft during inertial rotation thereof is equal to or greater than the predetermined value after the engine is automatically shut off, then the engine controller restarts the engine without performing the swing-back control process. Therefore, the engine can be restarted again very quickly.

According to the invention recited in claim 7, the first operating member and the second operating member are determined as being operated if the first operating member and the second operating member are operated by the first operational quantity or more. Consequently, the rider can keep the first operating member and the second operating member in an operational state with ease, without becoming fatigued as a result of operating the first operating member and the second operating member.

BRIEF DESCRIPTION OF DRAWINGS

FIG. 8 is a flowchart of an operation sequence of an engine restart judgment process carried out in step S34 of FIG. 7; and FIG. 9 is a block diagram of an engine control apparatus, which does not incorporate a throttle-by-wire system.

DESCRIPTION OF EMBODIMENTS

Engine control apparatus according to preferred embodiments of the present invention will be described in detail below with reference to the accompanying drawings.

Figure 1:
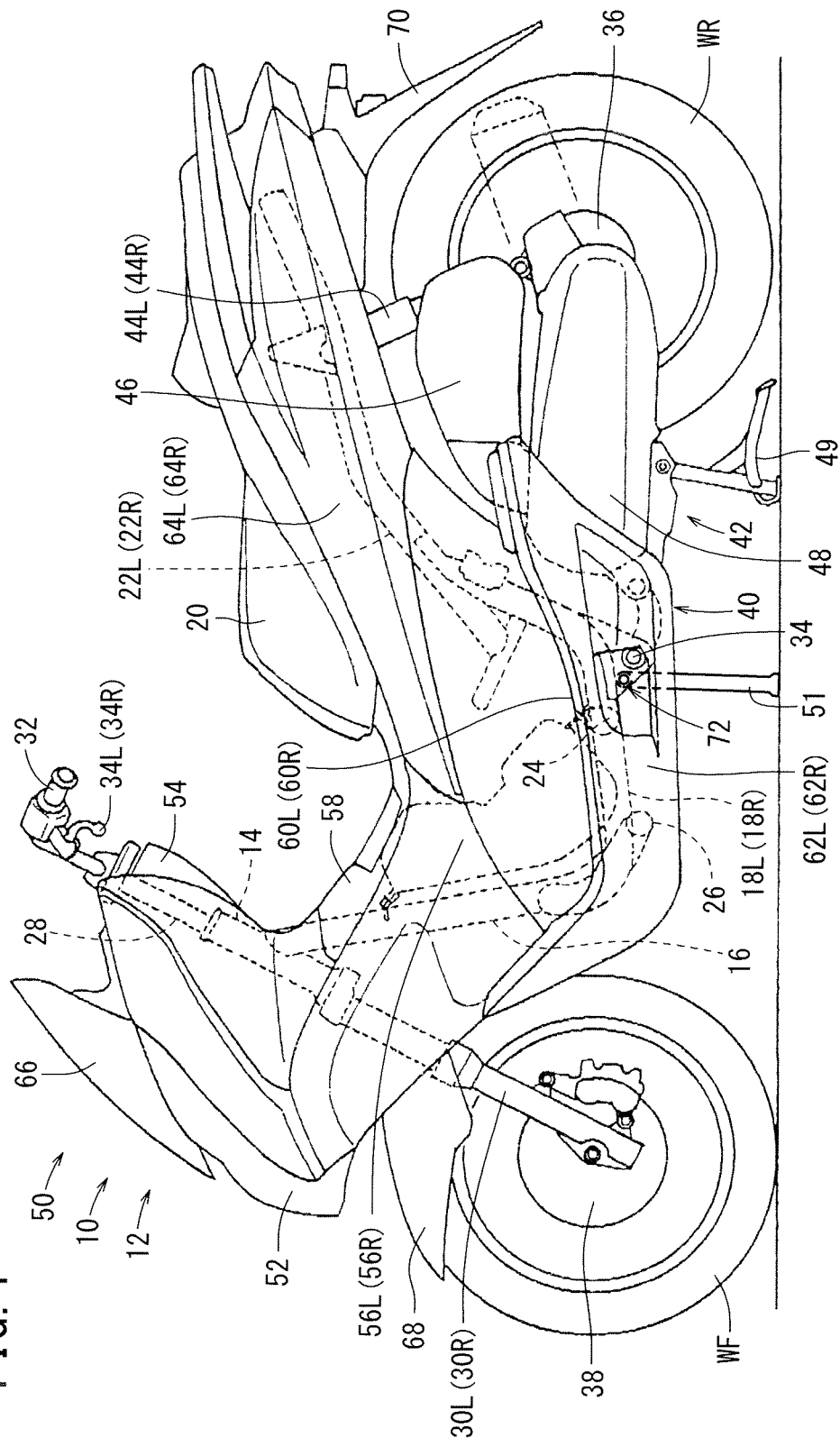
FIG. 1 is a left-hand side elevational view of a saddle-type vehicle incorporating an engine control apparatus according to an embodiment of the present invention.

FIG. 1 is a left-hand side elevational view of a saddle-type vehicle 10 incorporating an engine control apparatus according to an embodiment of the present invention. Mechanisms and components, which are positioned on left and right sides of the vehicle body, are distinguished by reference characters with a suffix "L" for mechanisms and components on the left side and reference characters with a suffix "R" for mechanisms and components on the right side.

A vehicle body frame 12 includes a head pipe 14, a down frame 16 extending rearward and downwardly from the head pipe 14, a pair of left and right lower frames 18L, 18R extending rearward from a lower portion of the down frame 16, and a pair of seat frames 22L, 22R extending rearward and upwardly from respective rear ends of the lower frames 18L, 18R and supporting a seat 20.

A cross frame 24 extends between and is supported by the lower frames 18L, 18R, and a front cross frame 26 is connected between the lower frames 18L, 18R ahead of the cross frame 24. A lower end of the down frame 16 is joined to the front cross frame 26, and hence is reinforced by the front cross frame 26.

A lower end of a steering stem 28, which is supported rotatably on the head pipe 14, is connected to front fork members 30L, 30R on which a front wheel WF is rotatably supported, and an upper end of the steering stem 28 is connected to a handle 32. The driver, i.e., the rider, of the saddle-type vehicle 10 steers the saddle-type vehicle 10 by turning the handle 32. The handle 32 includes a throttle, to be described later, on a right-hand portion thereof. The rider can instruct the saddle-type vehicle 10 to accelerate, and also can control the output power of an engine, to be described later, by turning the throttle. The handle 32 also has brake levers 34L, 34R. The brake lever (hereinafter referred to as a "rear brake lever") 34L instructs a brake system to brake a rear wheel WR, and the brake lever (hereinafter referred to as a "front brake lever") 34R instructs a brake system to brake the front wheel WF. More specifically, when the rider operates the rear brake lever (first operating member) 34L, a rear wheel brake 36 is actuated to apply a braking force to the rear wheel WR, and when the rider operates the front brake lever (second operating member) 34R, a front wheel brake 38 is actuated to apply a braking force to the front wheel WF.

A link mechanism 40 extends rearward from a link pivot 34 on rear portions of the lower frames 18L, 18R. The rear wheel (drive wheel) WR is rotatably supported by a swing unit 42, which is swingably mounted on a rear end of the link mechanism 40. The swing unit 42 doubles as a swing arm. Left and right cushion units 44L, 44R are connected between the seat frames 22L, 22R and the swing unit 42. An air cleaner 46 is mounted on the swing unit 42.

A power unit 48, which comprises an engine and a transmission, not shown, is disposed on an intermediate portion of the vehicle body frame 12. The power unit 48 and the swing unit 42 are constructed integrally with each other. A central stand 49 is connected to a lower portion of the swing unit 42, and a side stand 51 is connected to a front left side of the swing unit 42, for thereby supporting the saddle-type vehicle 10 in a leftwardly inclined posture.

The vehicle body frame 12 of the saddle-type vehicle 10 is covered with a vehicle body cover 50. The vehicle body cover 50 includes a front cover 52 covering a front portion of a vehicle body of the saddle-type vehicle 10, a central cowl 54 mounted on an upper portion of the front cover 52, a pair of left and right side covers 56L, 56R extending rearward from the front cover 52, a tunnel member 58 connected between the left and right side covers 56L, 56R in front of the seat 20 and joined to the central cowl 54, a pair of left and right under covers 62L, 62R disposed respectively below the left and right side covers 56L, 56R and having respective left and right steps 60L, 60R for placement of the rider's feet thereon, and a pair of left and right rear side covers 64L, 64R extending longitudinally of the vehicle, respectively, from the left and right side covers 56L, 56R below the seat 20. The vehicle body cover 50 is mounted on the vehicle body frame 12.

A windshield 66 is mounted on an upper portion of the front cover 52. A front fender 68 is disposed above the front wheel WF, and a rear fender 70 is disposed in a rearward position above the rear wheel WR. The side stand 51 is combined with a stand sensor 72, which detects whether or not the side stand 51 is lowered.

Figure 2:
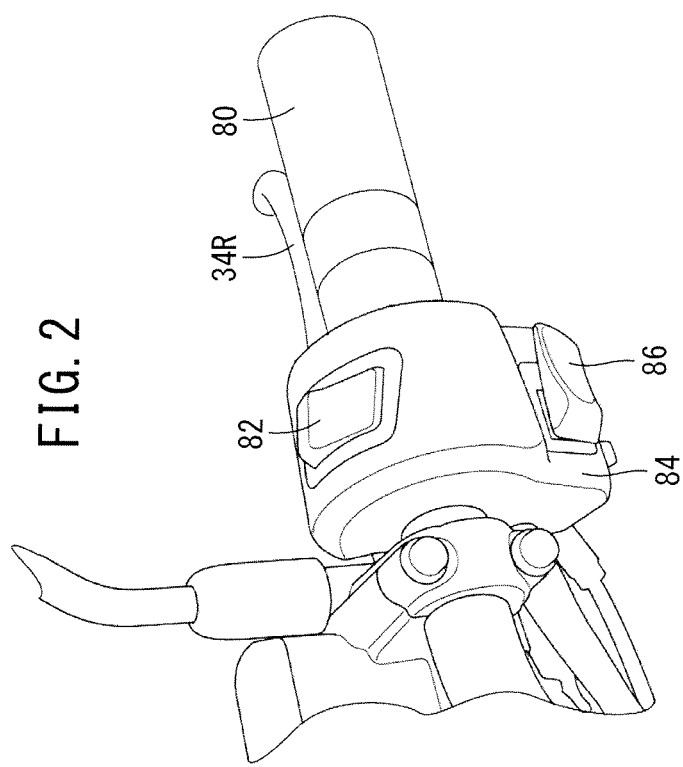
FIG. 2 is an enlarged fragmentary view of a right-hand portion of a handle.

FIG. 2 is an enlarged fragmentary view of a right-hand portion of the handle 32. A throttle 80 is angularly movably mounted on the right-hand portion of the handle 32. The handle 32 supports a casing 84, which is disposed on the left-hand side of the throttle 80. The casing 84 has an idling stop mode selector switch 82. By operating the idling stop mode selector switch 82, the rider can select either one of an idling stop execution mode and an idling stop inhibition mode. The idling stop execution mode is a mode that allows the engine to be automatically shut off (engine idling stop control process) if a certain condition is met. The idling stop inhibition mode is a mode for inhibiting the engine idling stop control process from being performed even if the aforementioned certain condition is met. The casing 84 also includes a starter switch 86 for starting the engine.

Figure 3:
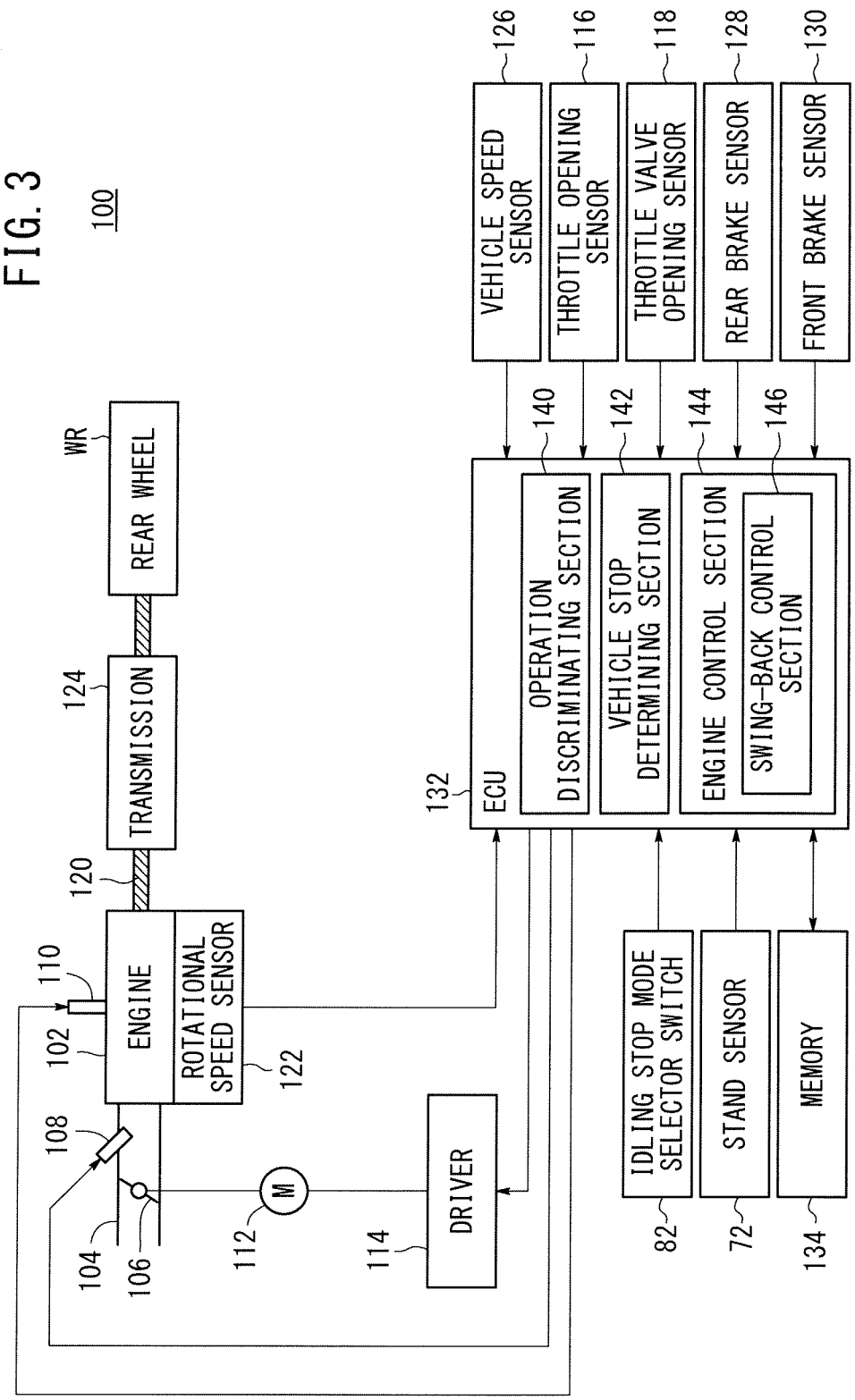
FIG. 3 is a block diagram of an engine control apparatus, which incorporates a throttle-by-wire system.

FIG. 3 is a block diagram of an engine control apparatus 100, which incorporates a throttle-by-wire (TBW) system. The engine control apparatus 100 includes an engine 102, a throttle valve 106 disposed in an intake pipe 104, an injector (fuel injection device) 108 for injecting fuel to thereby cause an air-fuel mixture to be drawn into a non-illustrated combustion chamber of the engine 102, and an ignition plug (ignition device) 110 for igniting the air-fuel mixture in the combustion chamber. The air-fuel mixture refers to a mixture of air and fuel.

The injector 108 ejects fuel into air, which has been introduced through the throttle valve 106 that adjusts the amount of intake air, thereby producing an air-fuel mixture. The generated air-fuel mixture flows into the combustion chamber of the engine 102, whereupon the air-fuel mixture is ignited by the ignition plug 110. The engine 102 converts the energy produced by the combusted air-fuel mixture into power.

A motor 112, which is energized by a driver 114, adjusts the opening of the throttle valve 106. The throttle valve 106 is opened depending on the degree of opening of the throttle 80. When the throttle 80 is turned by roughly a nil amount, the throttle valve 106 is set to an initial opening. When the throttle valve 106 is opened to the initial opening, the rotational speed of a crankshaft 120 of the engine 102 is referred to as an idling rotational speed, and at this time, the engine 102 is considered to be in an idling state. A throttle opening sensor (throttle opening detector) 116 detects the opening of the throttle 80, and a throttle valve opening sensor (throttle valve opening detector) 118 detects the degree of opening of the throttle valve 106.

The crankshaft 120, which serves as an output shaft of the engine 102, converts reciprocating movement of a piston, not shown, into rotational power. The crankshaft 120 rotates about its axis as the engine 102 operates, and the rotational speed of the crankshaft is determined depending on the drive power generated by the engine 102. A rotational speed sensor (rotational speed detector) 122 detects the rotational speed of the crankshaft 120 (engine rotational speed). The rotational power of the crankshaft 120 is transmitted to a transmission 124, which in turn transmits the rotational power to the rear wheel WR at a transmission ratio (speed reduction ratio), which may be changed selectively.

The engine control apparatus 100 also includes a vehicle speed sensor 126 for detecting the rotational speed of the rear wheel WR, a rear brake sensor (first operation detector) 128 for detecting whether or not the rear brake lever 34L is being operated, a front brake sensor (second operation detector) 130 for detecting whether or not the front brake lever 34R is being operated, an ECU (Engine Control Unit) 132, and a memory 134 for storing information. The ECU 132 is a control unit for controlling the engine control apparatus 100 in its entirety.

The ECU 132 includes an operation discriminating section 140, a vehicle stop determining section 142, and an engine control section 144. The ECU 132 also includes a clock circuit that functions as a timer for measuring time. The operation discriminating section (operation discriminator) 140 discriminates between operational states of the rear brake lever 34L and the front brake lever 34R. More specifically, based on detection signals from the rear brake sensor 128 and the front brake sensor 130, the operation discriminating section 140 determines whether or not the rear brake lever 34L is being operated and whether or not the front brake lever 34R is being operated.

The vehicle stop determining section (vehicle stop determiner) 142 determines whether or not the saddle-type vehicle 10 is in a stopped condition. More specifically, based on a vehicle speed detected by the vehicle speed sensor 126, the vehicle stop determining section 142 determines whether or not the saddle-type vehicle 10 is stopped.

The engine control section (engine controller) 144 serves to control operations of the engine 102. The engine control section 144 controls automatic shut off (engine idling stop control process) and restarting of the engine 102 depending on operational states of the rear brake lever 34L and the front brake lever 34R. More specifically, the engine control section 144 automatically shuts down the engine 102 after a predetermined time period has elapsed during a time that both the rear brake lever 34L and the front brake lever 34R are being operated. After the engine 102 has automatically been shut off, if either one of the rear brake lever 34L and the front brake lever 34R is operated, the engine control section 144 keeps the engine 102 automatically shut off. On the other hand, if both the rear brake lever 34L and the front brake lever 34R are released, the engine control section 144 restarts the engine 102.

The engine idling stop control process is a process for shutting off the engine 102 if a certain condition is met, such as the saddle-type vehicle 10 being in a stopped state while the engine 102 is idling and until the rider thereafter indicates an intention to start the saddle-type vehicle 10. In this manner, the engine idling stop control process reduces the emission of carbon dioxide ($CO_2$) and reduces fuel consumption.

Upon judging whether or not the engine 102 is to be automatically shut off, the engine control section 144 may take into account the opening of the throttle 80, which is detected by the throttle opening sensor 116, or the opening of the throttle valve 106, which is detected by the throttle valve opening sensor 118 (the opening of the throttle 80 and the opening of the throttle valve 106 will hereinafter be referred to collectively as a "throttle opening"), and such a judgment is made by the vehicle stop determining section 142. For example, if both the rear brake lever 34L and the front brake lever 34R are operated, the throttle opening is equal to or less than a first threshold value, and the vehicle stop determining section 142 determines that the saddle-type vehicle 10 is in a stopped condition, the engine control section 144 may automatically shut off the engine 102 upon elapse of a predetermined time period.

Upon judging whether or not the engine 102 is to be restarted after the engine 102 has been automatically shut off, the engine control section 144 may take into account the throttle opening, which is detected by the throttle opening sensor 116 or the throttle valve opening sensor 118. For example, if the throttle opening is greater than a second threshold value, then the engine control section 144 may restart the engine 102, even though one of the rear brake lever 34L and the front brake lever 34R is being operated. The first threshold value and the second threshold value may be identical to each other or may differ from each other. For example, the first threshold value may be less than the second threshold value.

The engine control section 144 includes a swing-back control section (swing-back controller) 146, which performs a swing-back control process for reversing the crankshaft 120 to a predetermined position after the engine 102 has automatically been shut off. The swing-back control section 146 energizes a starter motor, not shown, in order to reverse the crankshaft 120 to the predetermined position.

More specifically, subsequent to carrying out the swing-back control process, the engine control section 144 energizes the starter motor in order to rotate the crankshaft 120 in a normal direction after the crankshaft 120 has been reversed to the predetermined position, thereby restarting the engine 102. Since the crankshaft 120 has been reversed, i.e., swung back, to the predetermined position before the engine 102 is restarted, an increased stroke period is available before the piston reaches the top-dead-center position in the compression stroke, thereby increasing the rotational speed of the crankshaft 120 and causing the piston initially to move past the top-dead-center position in the compression stroke.

When the engine control section 144 restarts the engine 102, if the rotational speed of the crankshaft 120 as the crankshaft 120 rotates by inertia is equal to or greater than a predetermined value, then the engine control section 144 prohibits the swing-back control section 146 from performing the swing-back control process, but instead immediately restarts the engine 102. In other words, if the rotational speed of the crankshaft 120 as the crankshaft 120 rotates by inertia is equal to or greater than the predetermined value, the engine control section 144 restarts the engine 102 without performing the swing-back control process. Conversely, if the rotational speed of the crankshaft 120 as the crankshaft 120 rotates by inertia is lower than the predetermined value, the engine control section 144 restarts the engine 102 after having first performed the swing-back control process.

Figure 4:
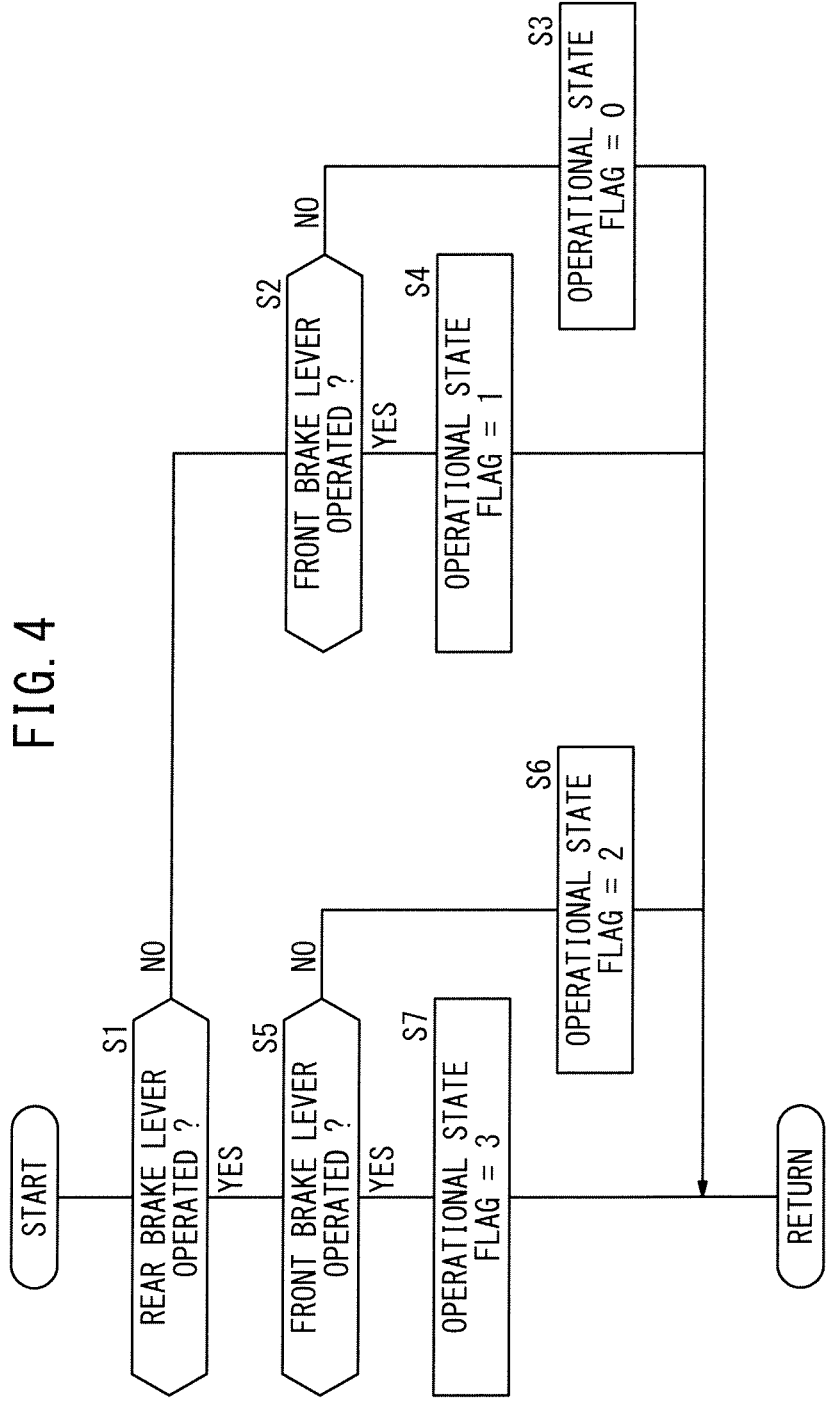
FIG. 4 is a flowchart of an operation sequence for distinguishing operational states of a rear brake lever and a front brake lever.

Operations of the engine control apparatus 100 will be described below with reference to the flowcharts shown in FIGS. 4 through 7. First, an operation sequence for distinguishing operational states of the rear brake lever 34L and the front brake lever 34R will be described below with reference to FIG. 4. The operation sequence shown in FIG. 4 is carried out in constant periodic cycles.

The operation discriminating section 140 determines whether or not the rear brake lever 34L is being operated (step S1). The operation discriminating section 140 makes this determination based on a detection signal from the rear brake sensor 128.

If the operation discriminating section 140 determines in step S1 that the rear brake lever 34L is not being operated, then the operation discriminating section 140 determines whether or not the front brake lever 34R is being operated (step S2). The operation discriminating section 140 makes this determination based on a detection signal from the front brake sensor 130.

If the operation discriminating section 140 determines in step S2 that the front brake lever 34R is not being operated, then the operation discriminating section 140 sets an operational state flag to 0 (operational state flag=0) (step S3) and returns to step S1. In other words, the operational state flag, which is set to 0, indicates that neither the rear brake lever 34L nor the front brake lever 34R is being operated. After returning to step S1, the operation discriminating section 140 waits until the arrival of a next execution timing. Upon arrival of the next execution timing, the operation discriminating section 140 again executes from step S1 the operation sequence shown in the flowchart of FIG. 4. It is assumed below, that upon returning to step S1, the operation discriminating section 140 waits until the arrival of the next execution timing. The value of the operational state flag is stored in an operational state flag storage area of the memory 134.

If the operation discriminating section 140 determines that the front brake lever 34R is being operated in step S2, the operation discriminating section 140 sets the operational state flag to 1 (operational state flag=1) (step S4) and then returns to step S1. In other words, the operational state flag, which is set to 1, indicates that only the front brake lever 34R is being operated.

If the operation discriminating section 140 determines that the rear brake lever 34L is being operated in step S1, then the operation discriminating section 140 judges whether or not the front brake lever 34R is being operated (step S5).

If the operation discriminating section 140 determines that the front brake lever 34R is not being operated in step S5, then the operation discriminating section 140 sets the operational state flag to 2 (operational state flag=2) (step S6) and then returns to step S1. In other words, the operational state flag, which is set to 2, indicates that only the rear brake lever 34L is being operated.

If the operation discriminating section 140 determines that the front brake lever 34R is being operated in step S5, then the operation discriminating section 140 sets the operational state flag to 3 (operational state flag=3) (step S7) and then returns to step S1. In other words, the operational state flag, which is set to 3, indicates that both the rear brake lever 34L and the front brake lever 34R are being operated.

In this manner, the operation discriminating section 140 determines operational states of the rear brake lever 34L and the front brake lever 34R, and sets the operational state flag to a value depending on the determined operational states.

Figure 5:
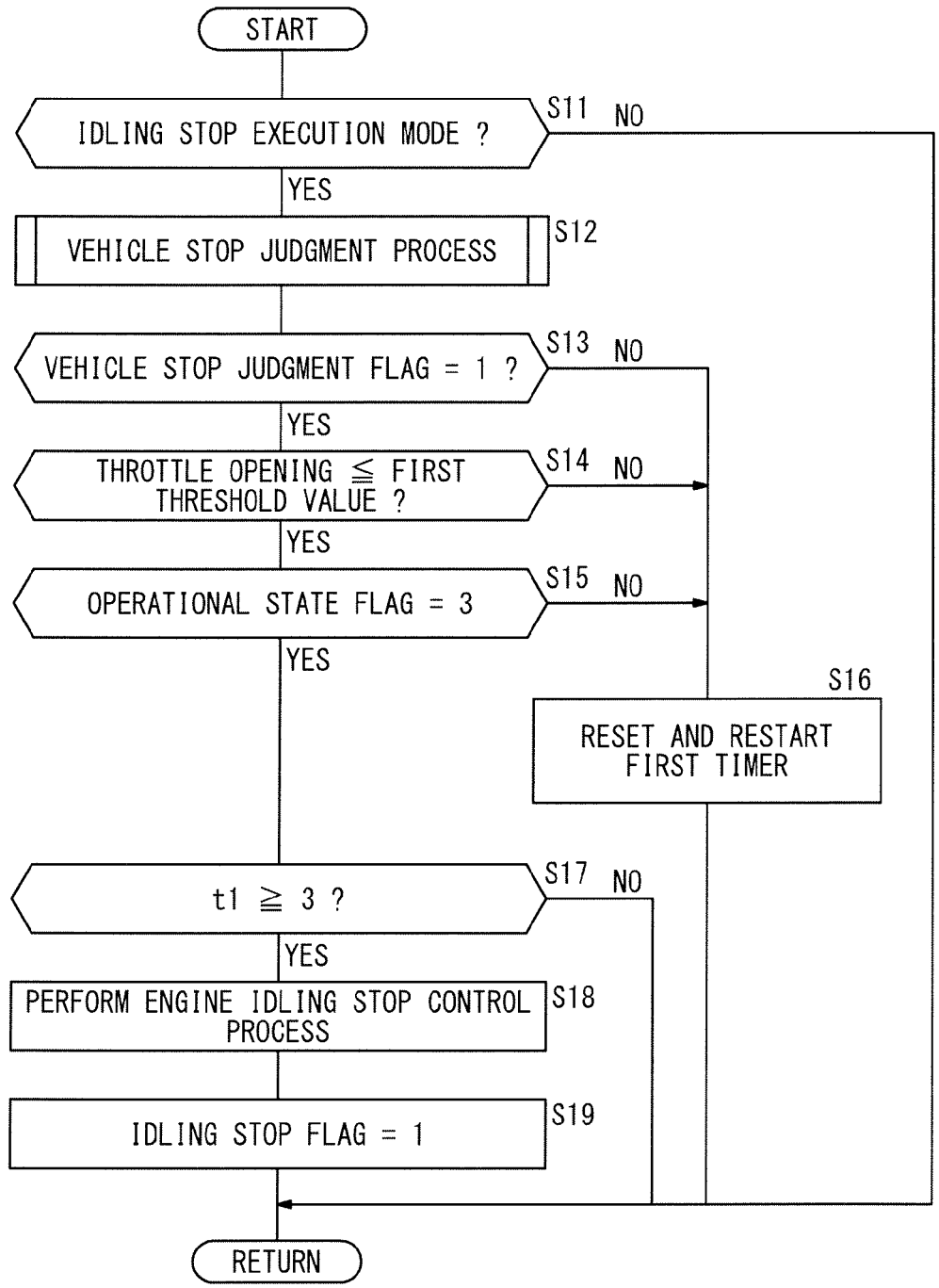
FIG. 5 is a flowchart of an operation sequence of an engine idling stop control process.

An operation sequence of the engine idling stop control process will be described below with reference to FIG. 5. The operation sequence shown in FIG. 5 is carried out in constant periodic cycles while the engine 102 is in operation. The engine control section 144 determines whether or not the idling stop execution mode is presently selected (step S11). In other words, the engine control section 144 determines whether or not the idling stop execution mode is selected by the idling stop mode selector switch 82.

If the engine control section 144 determines in step S11 that the idling stop execution mode is not selected, i.e., determines that the idling stop inhibition mode is selected, then the engine control section 144 repeats step S11. Therefore, when the idling stop inhibition mode is selected, the engine idling stop control process is not carried out. Having returned to step S11, the engine control section 144 waits until the arrival of a next execution timing. Upon arrival of the next execution timing, the engine control section 144 executes the operation sequence shown in the flowchart of FIG. 5 from step S11. It is assumed below that after having returned to step S11, the engine control section 144 waits until the arrival of the next execution timing.

If the engine control section 144 determines in step S11 that the idling stop execution mode is selected, then the vehicle stop determining section 142 performs a vehicle stop judgment process for determining whether or not the saddle-type vehicle 10 is in a stopped condition (step S12). The vehicle stop judgment process will be described later.

Next, the engine control section 144 determines whether or not the saddle-type vehicle 10 has been stopped in accordance with the vehicle stop judgment process (step S13). More specifically, the engine control section 144 determines that the saddle-type vehicle 10 is in a stopped condition if a vehicle stop judgment flag is set to 1 by the vehicle stop judgment process, and determines that the saddle-type vehicle 10 is not stopped if a vehicle stop judgment flag is set to 0.

If the engine control section 144 determines in step S13 that the saddle-type vehicle 10 is in a stopped condition, the engine control section 144 determines whether or not the throttle opening is equal to or less than the first threshold value (step S14). If the first threshold value is 1 degree (or if the engine control apparatus 100 does not incorporate a throttle-by-wire system, then the first threshold value is 0 degrees, thereby indicating that the throttle valve is fully closed), then the engine control section 144 is capable of determining whether or not the rider has an intention to stop the saddle-type vehicle 10, i.e., whether the rider has not operated the throttle 80.

If the engine control section 144 determines in step S14 that the throttle opening is equal to or less than the first threshold value, then the engine control section 144 determines whether or not the operational state flag is set to 3 (operational state flag=3) (step S15). In other words, in step S15, the engine control section 144 determines whether or not both the rear brake lever 34L and the front brake lever 34R are being operated, thereby determining whether or not the rider has an intention to stop the saddle-type vehicle 10.

If the engine control section 144 determines in step S13 that the saddle-type vehicle 10 is not in a stopped condition, or if the engine control section 144 determines in step S14 that the throttle opening is not equal to or less than the first threshold value, or if the engine control section 144 determines in step S15 that the operational state flag is not set to 3, or in other words, if any one of the conditions required to carry out the engine idling stop control process is not met, then the engine control section 144 resets and reinitializes a first timer (step S16) and thereafter control returns to step S11.

If the engine control section 144 determines in step S15 that the operational state flag is set to 3, i.e., if all of the conditions required to carry out the engine idling stop control process are met, then the engine control section 144 judges whether or not a time t1, which is measured by the first timer, is equal to or greater than 3 seconds (step S17). More specifically, in step S17, the engine control section 144 determines whether or not a predetermined time period has elapsed while all of the conditions required to carry out the engine idling stop control process are met, i.e., the saddle-type vehicle 10 is stopped, the throttle opening is equal to or less than the first threshold value, and both brake levers are being operated.

In step S17, the engine control section 144 determines whether or not the time t1, which is measured by the first timer, is equal to or greater than 3 seconds. However, the time period that is compared with the time t1 is not limited to 3 seconds. The engine control section 144 may judge whether or not the time t1, which is measured by the first timer, is equal to or greater than any certain time period.

If the engine control section 144 determines in step S17 that the time t1, which is measured by the first timer, is not equal to or greater than 3 seconds, i.e., if the time period that has elapsed while all of the conditions used to carry out the engine idling stop control process are met is less than the predetermined time period, then the engine control section 144 returns to step S11.

On the other hand, in step S17, if the engine control section 144 determines that the time t1, which is measured by the first timer, is equal to or greater than 3 seconds, then the engine control section 144 performs the engine idling stop control process (step S18) and thereafter the engine 102 is shut off. The engine idling stop control process is a process of inhibiting the injector 108 from injecting fuel while simultaneously inhibiting the ignition plug 110 from igniting fuel, thereby shutting off the engine 102.

Next, the engine control section 144 sets an idling stop flag to 1 (step S19) and then returns to step S11. The value of the idling stop flag is stored in an idling stop flag storage area of the memory 134. Setting of the idling stop flag to 1 indicates that the engine 102 has been shut off by the engine idling stop control process, whereas setting of the idling stop flag to 0 indicates otherwise. The idling stop flag is set to an initial value of 0. Since the operation sequence shown by the flowchart of FIG. 5 is carried out while the engine 102 is in operation, after the engine idling stop control process has been performed, the operation sequence shown by the flowchart of FIG. 5 is not carried out, even if control returns to step S1.

As described above, the engine idling stop control process is carried out if the predetermined time period has elapsed while the saddle-type vehicle 10 is in a stopped condition, the throttle opening is equal to or less than the first threshold value, i.e., the engine 102 is idling, and both the rear brake lever 34L and the front brake lever 34R are being operated. Therefore, it is possible to detect with high accuracy the intention of the rider to stop the saddle-type vehicle 10, and to stop the engine 102 from idling based on the rider's intention to stop the saddle-type vehicle 10. The engine 102 is prevented from being shut off automatically at times that the saddle-type vehicle 10 is running by inertia and both the rear brake lever 34L and the front brake lever 34R are being operated.

After having determined that the throttle opening is equal to or less than the first threshold value and that the saddle-type vehicle 10 is stopped, the operation discriminating section 140 determines whether or not both the rear brake lever 34L and the front brake lever 34R are being operated. Consequently, the engine 102 is prevented from being automatically shut off during times that the saddle-type vehicle 10 is running by inertia and while both the rear brake lever 34L and the front brake lever 34R are being operated, and in this manner, the engine control section 144 can determine quickly whether or not the engine 102 should be automatically shut off. More specifically, if the throttle opening is greater than the first threshold value, or if the saddle-type vehicle 10 is not in a stopped condition, then the engine control section 144 determines that the engine 102 should not be automatically shut off, regardless of the operational states of the rear brake lever 34L and the front brake lever 34R. Therefore, the engine control section 144 can quickly carry out such a determination.

It has been described above that the engine idling stop control process is carried out only if all of the three conditions are met, i.e., if the throttle opening is equal to or less than the first threshold value, the saddle-type vehicle 10 is stopped, and both the rear brake lever 34L and the front brake lever 34R are being operated. However, the condition concerning operational states of the brake levers may be changed to a condition in which at least one of the rear brake lever 34L and the front brake lever 34R is being operated. Furthermore, if it is determined in step S14 of FIG. 5 that the throttle opening is equal to or less than the first threshold value, then control may proceed to step S15 of FIG. 5, after the operation sequence shown in FIG. 4 for determining the operational states of the rear brake lever 34L and the front brake lever 34R has been carried out.

Figure 6:
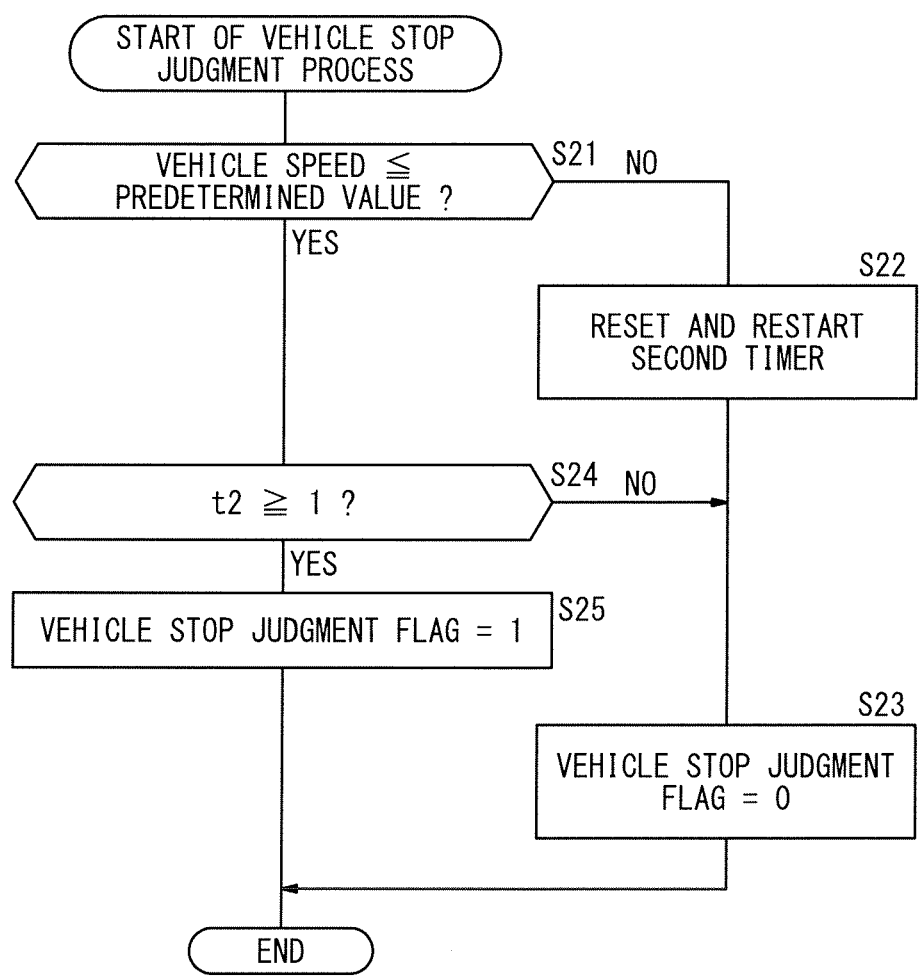
FIG. 6 is a sub-flowchart of an operation sequence of a vehicle stop judgment process carried out in step S12 of FIG. 5.

An operation sequence of the vehicle stop judgment process, which is performed in step S12 of FIG. 5, will be described below with reference to a sub-flowchart shown in FIG. 6. Upon commencement of the vehicle stop judgment process, which is performed in step S12 of FIG. 5, control proceeds to step S21, during which the vehicle stop determining section 142 determines whether or not the vehicle speed detected by the vehicle speed sensor 126 is equal to or lower than a predetermined value of 3 km/s, for example.

If the vehicle stop determining section 142 determines in step S21 that the detected vehicle speed is not equal to or lower than the predetermined value, then the vehicle stop determining section 142 resets and reinitializes a second timer (step S22), and then sets the vehicle stop judgment flag to 0 (vehicle stop judgment flag=0) (step S23), after which control proceeds to step S13 of FIG. 5. The value of the vehicle stop judgment flag is stored in a vehicle stop judgment flag storage area of the memory 134. Initially, the vehicle stop judgment flag is set to an initial value of 0.

If the vehicle stop determining section 142 determines in step S21 that the detected vehicle speed is equal to or lower than the predetermined value, then the vehicle stop determining section 142 determines whether or not a time t2, which is measured by the second timer, is equal to or greater than 1 second (step S24). In step S24, the vehicle stop determining section 142 determines whether or not the time t2, which is measured by the second timer, is equal to or greater than 1 second. However, the time period that is compared with the time t2 is not limited to 1 second. Rather, the vehicle stop determining section 142 may determine whether or not the time t2, which is measured by the second timer, is equal to or greater than any certain time period. In step S24, the vehicle stop determining section 142 determines whether or not a predetermined time period has elapsed while the vehicle speed is equal to or lower than the predetermined value.

If the vehicle stop determining section 142 determines in step S24 that the time t2, which is measured by the second timer, is not equal to or greater than 1 second, i.e., if the predetermined time period that has elapsed while the vehicle speed is equal to or lower than the predetermined value is less than a certain time period, then the vehicle stop determining section 142 proceeds to step S23, in which the vehicle stop judgment flag is set to 0. Thereafter, control proceeds to step S13 of FIG. 5.

If the vehicle stop determining section 142 determines in step S24 that the time t2, which is measured by the second timer, is equal to or greater than 1 second, i.e., if the certain time period has elapsed while the vehicle speed is equal to or lower than the predetermined value, then the vehicle stop determining section 142 sets the vehicle stop judgment flag to 1 (vehicle stop judgment flag=1) (step S25) and thereafter control proceeds to step S13 of FIG. 5.

As described above, the saddle-type vehicle 10 is determined to be in a stopped condition, i.e., the vehicle speed is determined as being equivalent to "0", if the certain time period has elapsed while the detected vehicle speed is equal to or less than the predetermined value. Consequently, it is possible to determine with high accuracy whether or not the saddle-type vehicle 10 is in a stopped condition.

Figure 7:
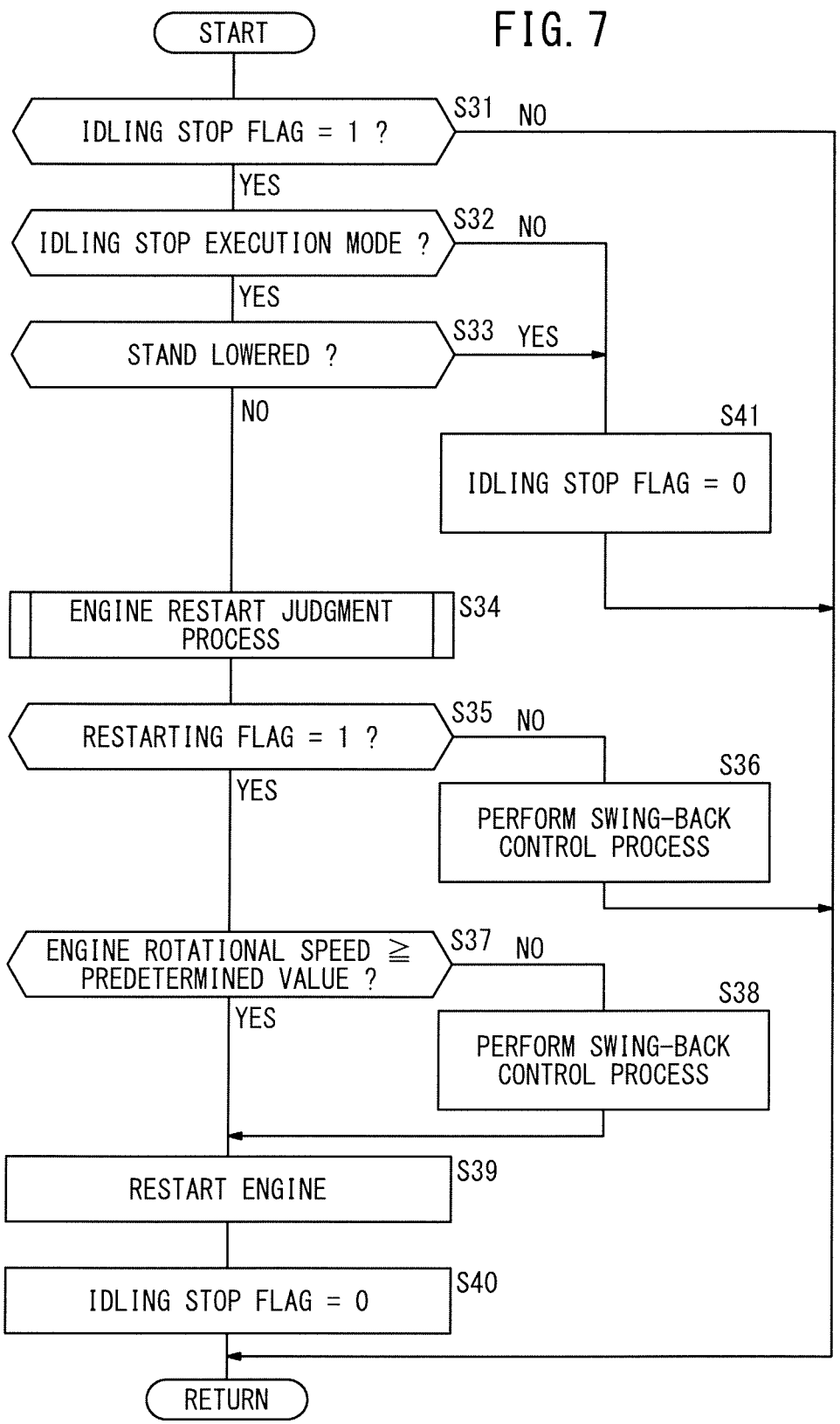
FIG. 7 is a flowchart of an operation sequence of an engine restarting process.

An operation sequence of an engine restarting process for restarting the engine 102 after the engine idling stop control process has been carried out will be described below with reference to the flowchart shown in FIG. 7. The operation sequence shown in FIG. 7 is carried out in constant periodic cycles. The engine control section 144 determines whether or not the idling stop flag is 1 (step S31). In other words, the engine control section 144 determines whether or not the engine 102 has been shut off by the engine idling stop control process.

If the engine control section 144 determines in step S31 that the idling stop flag is not 1, i.e., if the engine control section 144 determines that the idling stop flag is 0, then the engine control section 144 returns to step S31. Therefore, if the engine 102 has not been shut off by the engine idling stop control process, the operation sequence of FIG. 7 does not restart the engine 102. After returning to step S31, the engine control section 144 waits until the arrival of a next execution timing. Upon arrival of the next execution timing, the engine control section 144 executes from step S31 the operation sequence shown in the flowchart of FIG. 7. It is assumed below, that having returned to step S31, the engine control section 144 waits until the next execution timing arrives.

If the engine control section 144 determines in step S31 that the idling stop flag is 1, then the engine control section 144 determines whether or not the idling stop execution mode is selected (step S32). If the idling stop inhibition mode is selected, then inasmuch as the engine idling stop control process is inhibited from being performed, the engine 102 does not need to be restarted in step S39 of FIG. 7.

If the engine control section 144 determines in step S32 that the idling stop execution mode is selected, then the engine control section 144 determines whether or not the side stand 51 has been lowered (step S33). The engine control section 144 judges whether or not the side stand 51 is lowered based on a detection signal from the stand sensor 72. If the side stand 51 has been lowered, then it may be assumed that the rider has stopped driving the saddle-type vehicle 10, and hence the engine 102 does not need to be restarted in step S39 of FIG. 7.

If the engine control section 144 determines in step S33 that the side stand 51 has been lowered, the engine control section 144 carries out an engine restart judgment process (step S34). The engine restart judgment process will be described later.

Then, the engine control section 144 determines whether or not the engine 102 has been judged as having been restarted by the engine restart judgment process (step S35). More specifically, if a restarting flag has been set to 1 by the engine restart judgment process, the engine control section 144 determines that the engine 102 should be restarted, and if the restarting flag is set to 0 by the engine restart judgment process, the engine control section 144 determines that the engine 102 should not be restarted. If the engine control section 144 determines in step S35 that the engine 102 should not be restarted, then the engine control section 144 performs the swing-back control process (step S36) and then returns to step S31. The engine 102 thus prepares itself for restarting at a later time. After the swing-back control process is completed, restarting of the engine 102 will not subsequently be carried out, and the engine 102 is kept in a shut off state.

If the engine control section 144 determines in step S35 that the engine 102 should be restarted, then the engine control section 144 terminates continuation of the engine idling stop control process and restarts the engine 102. For smoothly restarting the engine 102, it is necessary to perform the swing-back control process prior to the engine 102 being restarted. However, if the engine rotational speed is equal to or greater than a predetermined value, then the piston is capable of moving past the top-dead-center position in the compression stroke, even if the swing-back control process is not carried out.

Therefore, if the engine control section 144 determines in step S35 that the engine 102 should be restarted, the engine control section 144 determines whether or not the present engine rotational speed, which is detected by the rotational speed sensor 122, is equal to or greater than a predetermined value (step S37). Since the engine 102 presently is shut off, any rotation of the crankshaft 120 that is presently undergoing is regarded as rotation by inertia.

If the engine control section 144 determines in step S37 that the engine rotational speed is not equal to or greater than the predetermined value, the swing-back control section 146 carries out the swing-back control process (step S38). Thereafter, the engine control section 144 restarts the engine 102 (step S39). If the engine rotational speed is not equal to or greater than the predetermined value, then since the piston may possibly be incapable of moving past the top-dead-center position in the compression stroke, the starter motor reverses (swings back) the crankshaft 120 to a predetermined position in order to provide an increased stroke period for the piston to be able to reach the top-dead-center position in the compression stroke, so that the piston can move past the top-dead-center position in the compression stroke. Thereafter, the engine control section 144 energizes the starter motor to rotate the crankshaft 120 in the normal direction, and controls the injector 108 and the ignition plug 110 to restart the engine 102. The engine control section 144 also controls the opening of the throttle valve 106, depending on the throttle opening detected by the throttle opening sensor 116. Consequently, the engine control section 144 is capable of restarting the engine 102 smoothly. Even if the engine control section 144 determines that the engine rotational speed is not equal to or greater than the predetermined value, in the event that the swing-back control process has already been carried out in step S36, then since the swing-back control process does not have to be carried out in step S38, control may proceed directly to step S39.

If the engine control section 144 determines in step S37 that the engine rotational speed is equal to or greater than the predetermined value, then the swing-back control section 146 prohibits the swing-back control process from being carried out and immediately restarts the engine 102 (step S39). Stated briefly, the engine control section 144 energizes the starter motor to rotate the crankshaft 120 in the normal direction, and controls the injector 108 and the ignition plug 110 to restart the engine 102. Thus, the engine control section 144 is capable of restarting the engine 102 quickly.

After the engine 102 has been restarted in step S39, the engine control section 144 sets the idling stop flag to 0 (step S40) and then returns to step S31.

If the engine control section 144 determines that the idling stop execution mode has not been selected in step S32, or if the engine control section 144 determines that the side stand 51 has been lowered in step S33, then the engine control section 144 sets the idling stop flag to 0 (idling stop flag=0) (step S41) and thereafter returns to step S31. More specifically, if the idling stop execution mode is not selected, the engine control section 144 sets the idling stop flag to 0 in order to stop the engine idling stop control process from continuing. Further, if the side stand 51 is lowered, then since it can be considered that the rider intends to stop using the saddle-type vehicle 10, the engine control section 144 also sets the idling stop flag to 0 in order to stop the engine idling stop control process from continuing. When the idling stop flag is set to 0, the engine 102 is shut off normally, rather than being shut off by the idling stop control process. Therefore, the engine 102 will not be restarted in step S39.

For starting the engine 102 after the engine 102 has been shut off normally, the rider operates the starter switch 86 while simultaneously operating the rear brake lever 34L or the front brake lever 34R, thereby starting the engine 102.

An operation sequence of the engine restart judgment process, which is carried out in step S34 of FIG. 7, will be described below with reference to the flowchart shown in FIG. 8. When the engine restart judgment process is initiated in step S34 of FIG. 7, control proceeds to step S51 of FIG. 8, during which the engine control section 144 determines whether or not the throttle opening, which is detected by the throttle opening sensor 116, is greater than the second threshold value. In step S51, the engine control section 144 determines whether or not the rider has operated the throttle 80. The second threshold value preferably is equal to or greater than the first threshold value.

If the engine control section 144 determines in step S51 that the throttle opening is greater than the second threshold value, then the engine control section 144 sets the restarting flag to 1 (restarting flag=1) (step S52). When the throttle opening is greater than the second threshold value, even if one of the rear brake lever 34L and the front brake lever 34R is being operated, the engine 102 is restarted in step S39 of FIG. 7. Therefore, the engine 102 can be restarted smoothly when the saddle-type vehicle 10 is expected to start moving uphill on a slope. The value of the restarting flag is stored in a restarting flag storage area of the memory 134.

The throttle opening becomes greater than the second threshold value if the rider is operating the throttle 80. In such a situation, it is inconceivable that the rider would be operating both the rear brake lever 34L and the front brake lever 34R at the same time.

If the engine control section 144 determines in step S51 that the throttle opening is equal to or less than the second threshold value, then the engine control section 144 determines whether or not the operational state flag is set to 0 (step S53).

If the engine control section 144 determines in step S53 that the operational state flag is 0, i.e., if both the rear brake lever 34L and the front brake lever 34R are not being operated, then the engine control section 144 sets the restart flag to 1 (restart flag=1) (step S52). Therefore, if both the rear brake lever 34L and the front brake lever 34R are released, the engine 102 is restarted in step S39 of FIG. 7, and the intention of the rider to start the saddle-type vehicle 10 can be reflected quickly upon restarting the engine 102.

If the engine control section 144 determines in step S53 that the operational state flag is not 0, i.e., if at least one of the rear brake lever 34L and the front brake lever 34R is being operated, then the engine control section 144 sets the restarting flag to 0 (restarting flag=0) (step S54). Therefore, the engine 102 is not restarted, but rather is continuously stopped from idling, i.e., is continuously shut off, when at least one of the rear brake lever 34L and the front brake lever 34R is being operated and the rider is not operating the throttle 80. Consequently, a desired one of the rider's left and right hands is left free for convenience. More specifically, since the engine 102 is stopped continuously from idling as a result of the rider operating either the rear brake lever 34L or the front brake lever 34R with one hand, the rider does not need to operate the front brake lever 34R or the rear brake lever 34L with the other hand, and the rider's other hand can be left free.

Priority is given to the throttle opening rather than the operational states of the rear brake lever 34L and the front brake lever 34R, as a basis for determining whether or not the engine 102 should be restarted. As a result, the intention of the rider to start the saddle-type vehicle 10 can quickly be reflected upon restarting the engine 102.

If the engine control section 144 determines in step S51 of FIG. 8 that the throttle opening is equal to or less than the second threshold value, then the engine control section 144 may proceed to step S53 after the operational states of the rear brake lever 34L and the front brake lever 34R have been determined. Alternatively, steps S53 and S51 may be switched, such that step S53 is executed prior to the execution of step S51.

The rear brake sensor 128 and the front brake sensor 130 will briefly be described below. Since the rear brake sensor 128 and the front brake sensor 130 are identical in structure, only the rear brake sensor 128 will be described, and the front brake sensor 130 will not be described in detail.

The rear brake sensor 128 has a first switch and a second switch, not shown, which produce ON signals upon operation of the rear brake lever 34L. The first switch comprises a switch that is turned on in order to produce an ON signal when the rider operates the rear brake lever 34L by a first operational quantity or more. The second switch comprises a switch that is turned on in order to produce an ON signal when the rider operates the rear brake lever 34L by a second operational quantity or more. The second operational quantity is greater than the first operational quantity. Therefore, in order to turn on the second switch, the rear brake lever 34L must be operated by a quantity that is greater than the quantity by which the rear brake lever 34L is operated to turn on the first switch.

Consequently, the rear brake sensor 128 comprises a sensor that is capable of detecting operation of the rear brake lever 34L in two stages, which are represented respectively by the first operational quantity and the second operational quantity. Likewise, the front brake sensor 130 comprises a sensor that is capable of detecting operation of the front brake lever 34R in two stages, which are represented by the first operational quantity and the second operational quantity. Alternatively, only one of the brake sensors, e.g., the rear brake sensor 128, may be capable of detecting operation of the corresponding brake lever in two stages.

If the rear brake sensor 128 detects that the rear brake lever 34L has been operated by the first operational quantity or more, i.e., when the first switch of the rear brake sensor 128 produces an ON signal, then in step S1 of FIG. 4, the operation discriminating section 140 determines that the rear brake lever 34L is being operated. Similarly, if the front brake sensor 130 detects that the front brake lever 34R has been operated by the first operational quantity or more, i.e., when the first switch of the front brake sensor 130 produces an ON signal, then in step S1 and step S5 of FIG. 4, the operation discriminating section 140 determines that the front brake lever 34R is being operated.

The operation discriminating section 140 thus determines that the rear brake lever 34L and the front brake lever 34R are being operated upon operation of the rear brake lever 34L and the front brake lever 34R by the first operational quantity or more. Therefore, the rider does not become fatigued from operating the rear brake lever 34L and the front brake lever 34R in order to carry out and continue the engine idling stop control process, but can maintain operation of the rear brake lever 34L and the front brake lever 34R with ease. For example, in order to continue the engine idling stop control process, the rider must keep at least one of the rear brake lever 34L and the front brake lever 34R operated. At this time, the rider can keep the rear brake lever 34L or the front brake lever 34R operated with ease without becoming fatigued.

The above embodiment may be modified in the following manner.

(Modification 1)

In the above embodiment, the saddle-type vehicle 10 includes the stand sensor 72 for detecting whether or not the side stand 51 has been lowered. The saddle-type vehicle 10 may also have a central stand sensor for detecting whether or not the central stand 49 has been lowered. In step S33, the engine control section 144 may determine whether or not the central stand 49 has been lowered, or whether or not at least one of the central stand 49 and the side stand 51 has been lowered.

(Modification 2)

In the above embodiment, the engine control apparatus 100 incorporates a throttle-by-wire (TBW) system. However, the engine control apparatus 100 need not necessarily incorporate such a throttle-by-wire (TBW) system. FIG. 9 is a block diagram of an engine control apparatus, which does not incorporate a TBW system. Parts of the engine control apparatus shown in FIG. 9, which are identical to those of the engine control apparatus shown in FIG. 3, are denoted by identical reference characters, and such features will not be described in detail below.

The throttle 80 and the throttle valve 106 are connected to each other through a wire 150. The throttle valve 106 is opened when the rider operates the throttle 80. More specifically, when the rider operates the throttle 80, the wire 150 opens the throttle valve 106. When the opening of the throttle 80 is 0 degrees, the opening of the throttle valve 106 similarly is 0 degrees. The intake pipe 104 includes a bypass passage 105a, which houses an idling air control valve 105b therein. When the engine 102 is idling, the throttle valve 106 is fully closed, i.e., the opening of the throttle valve 106 is 0 degrees. Upon adjusting the opening of the idling air control valve 105b, air can be delivered into the bypass passage 105a to keep the engine 102 operating at an idling rotational speed.

If the saddle-type vehicle 10 is a scooter-type vehicle, then the transmission 124 may comprise a continuously variable transmission, e.g., a V-belt type of continuously variable transmission. This also holds true for the above embodiment.

While preferred embodiments of the present invention have been described above, the technical scope of the present invention is not limited by the descriptions of the embodiments. It will be obvious to those skilled in the art that various changes and modifications may be made to the above embodiments. It is clear from the scope of the patent claims that such changes and modifications fall within the technical scope of the present invention. The parenthetical reference characters, which are included in the scope of the patent claims, correspond with the reference characters in the accompanying drawings for facilitating understanding of the present invention, although the present invention should not be construed as being limited to the components bearing such reference characters.

The invention claimed is:

1. An engine control apparatus comprising:
   a first operating member and a second operating member operable by a rider of a saddle riding vehicle to brake a front wheel and a rear wheel of the saddle-riding vehicle;
   an operation discriminator for discriminating operational states of the first operating member and the second operating member; and
   an engine controller for automatically shutting off and restarting an engine mounted on the saddle-riding vehicle depending on operational states of the first operating member and the second operating member,
   wherein the engine controller automatically shuts off the engine upon elapse of a predetermined time period during a time that both the first operating member and the second operating member are operated, restarts the engine if both the first operating member and the second operating member are released, and keeps the engine automatically shut off if either one of the first operating member and the second operating member is operated after the engine has been automatically shut off.

2. The engine control apparatus according to claim 1, further comprising:
   a throttle opening detector for detecting an opening of a throttle for instructing the engine to accelerate; and
   a vehicle stop determiner for determining whether or not the saddle-riding vehicle is stopped,
   wherein the engine controller automatically shuts off the engine upon elapse of the predetermined time period during a time that both the first operating member and the second operating member are operated, the opening of the throttle is equal to or less than a first threshold value, and the vehicle stop determiner determines that the saddle-riding vehicle is stopped.

3. The engine control apparatus according to claim 2, wherein the engine controller determines whether both the first operating member and the second operating member are operated after the throttle opening detector detects that the opening of the throttle is equal to or less than the first threshold value, and the vehicle stop determiner determines that the saddle-riding vehicle is stopped.

4. The engine control apparatus according to claim 2, wherein the engine controller restarts the engine if the opening of the throttle is greater than a second threshold value after the engine has been automatically shut off, even if one of the first operating member and the second operating member is operated.

5. The engine control apparatus according to claim 4, wherein the engine controller determines whether the opening of the throttle is greater than the second threshold value after the engine has been automatically shut off, restarts the engine if the opening of the throttle is greater than the second threshold value, determines whether both the first operating member and the second operating member are not being operated if the opening of the throttle is not greater than the second threshold value, and restarts the engine if both the first operating member and the second operating member are not operated.

6. The engine control apparatus according to claim 1, further comprising:
   a rotational speed detector for detecting a rotational speed of a crankshaft, which rotates as the engine operates,
   wherein the engine controller includes a swing-back controller for performing a swing-back control process for reversing the crankshaft after the engine has been automatically shut off, and restarts the engine without performing the swing-back control process if the rotational speed of the crankshaft, which rotates by inertia, is equal to or greater than a predetermined value at a time that the engine is to be restarted.

7. The engine control apparatus according to claim 1, further comprising:
   a first operation detector for detecting operation of the first operating member; and
   a second operation detector for detecting operation of the second operating member,
   wherein the first operation detector and the second operation detector are capable of detecting operations of the first operating member and the second operating member in two stages, which are represented respectively by a first operational quantity, and a second operational quantity that is greater than the first operational quantity, and
   wherein the operation discriminator determines that the first operating member is being operated if the first operation detector detects operation of the first operating member by the first operational quantity or more, and determines that the second operating member is being operated if the second operation detector detects operation of the second operating member by the first operational quantity or more.

* * * * *